Figure 1:
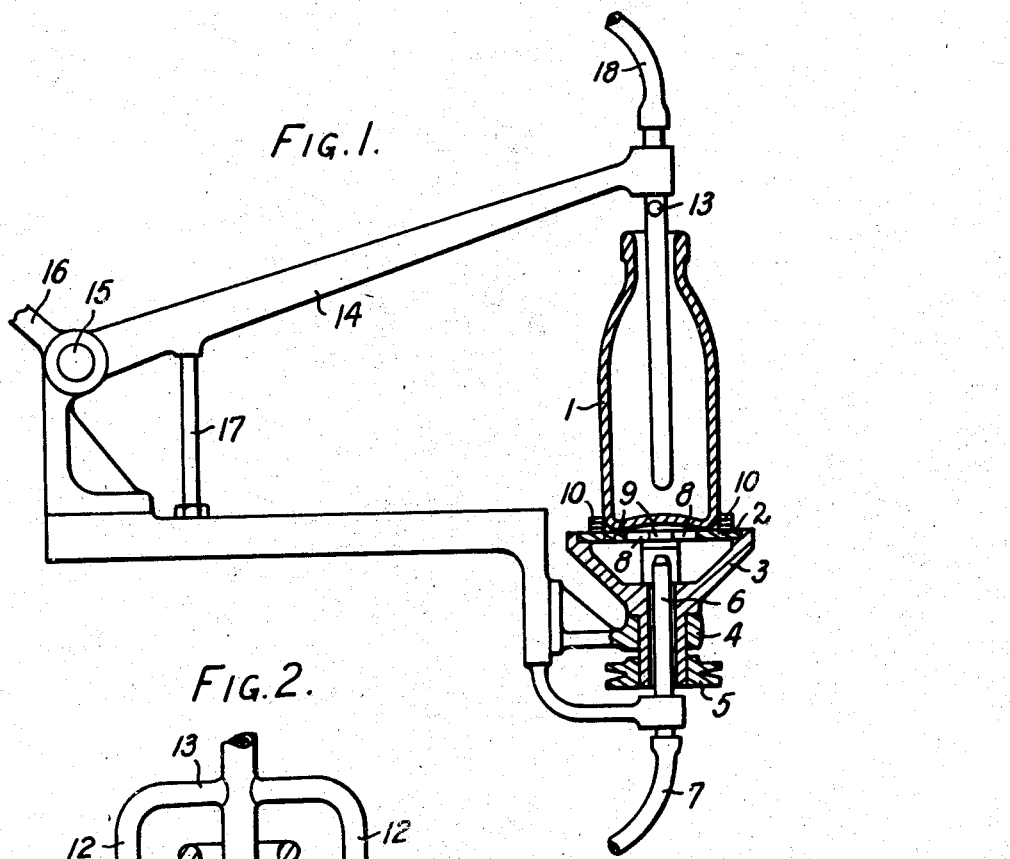

Jan. 6, 1942.  J. B. MITFORD  2,269,060

TEMPERING OF HOLLOW GLASS ARTICLES

Filed Nov. 2, 1939

INVENTOR.
JOHN BAWDEN MITFORD

F. H. Knight.
ATTORNEY.

Patented Jan. 6, 1942

2,269,060

UNITED STATES PATENT OFFICE 2,269,060

TEMPERING OF HOLLOW GLASS ARTICLES

John Bawden Mitford, Rainhill, England, assignor to Corning Glass Works, Corning, N. Y., a company of New York Application November 2, 1939, Serial No. 302,597
In Great Britain October 20, 1938

3 Claims. (Cl. 49—89)

This invention relates to the toughening of glass bottles and has for its object an improved method of chilling the heated bottle by gaseous chilling medium so as to toughen it to a high degree and so that the outer and inner surfaces are in substantially equal compression.

Hollow articles have been toughened by blowing air on their outer surfaces by external jet tubes and on their inner surfaces by internal jet tubes, as described in the specification of Letters Patent No. 2,054,595, and the toughening so produced is satisfactory for many purposes, provided that the article is open at both ends or, if closed at one end, has a mouth at least as large as its length. Bottles such as milk bottles, however, when so toughened hitherto are found not to have the strength of the toughened flat glass of commerce and, more particularly are deficient in resistance to thermal shock.

Applicants have found that this deficiency in strength is due to the compression in the inner surface being less than that in the outer surface, so that the layer of maximum tension in the glass is not the central layer.

Heretofore it has been the practice in toughening glass by air jets to produce stresses symmetrical about the central layer by blowing air on the two surfaces at equal rates per unit of surface. It has been found in the case of bottles, that this practice does not abstract heat at an equal rate from the outer and inner surfaces, and further, it has been found that it is necessary to abstract heat by the air at a higher rate from the inner surface than from the outer surface.

The reasons for these facts are, first, air blown into a bottle has all to escape from the mouth, and therefore there is a rapid flow of air along the length of the bottle from the bottom towards the mouth. This flow is at right angles to the jets of air directed against the inner surface, and therefore diverts the jets and diminishes the velocity with which the air strikes the surface. Thereby the cooling efficiency of the jets is diminished, so that a given jet of air abstracts heat at a lesser rate when directed against the inner surface than when directed against the outer surface. Secondly, during the first portion of the cooling, a substantial portion of the cooling of the outer surface is effected by radiation to the cold surroundings. The inner surface, however, is exposed only to itself, and cannot appreciably cool by radiation. Consequently, as compared with the outer surface, to secure an equal rate of fall of temperature, heat must be abstracted by the air at a greater rate from the inner surface. There is a third reason why cooling by air jets is less effective on the inner surface than on the outer surface, namely that, for a given pressure of air supply, a smaller difference of pressure is available to produce a jet, for the reason that there is a pressure of air inside the bottle. This difference is material when low pressure air with large jet holes is used, but is less important than the previously mentioned facts when high pressures, such as 50 lbs. per sq. in. are used.

It has been found that, to toughen a bottle such as a milk bottle symmetrically, from one and a half to two times as much air should be directed against the inner surface as against the outer surface. And, since the cooling effect of a given volume of air varies largely with the velocity of the air in the jet, it is assumed, in making this comparison, that the air issues from the inner and outer jet holes with the same velocity. Thus, by way of example, if the inner and outer jet tubes are connected to the same air supply, and the same size of jet hole is used, there should be from one and a half to two times as many jet holes in the inner as in the outer jet tubes. It is assumed further in making the comparison, that the jets are all directed normally to the surface, since they are then most effective.

Further, in order to secure uniformity of toughening from the base to the mouth of the bottle, it has been found necessary to distribute the blowing non-uniformly over the inner surface, by directing a substantially greater volume of air per unit of surface against the surface near the corner formed by the junction of the sides and base. The reason for this is that air blown against any point of the inside surface has to travel towards the mouth, and there is no tendency for it to travel towards the base. Therefore the air has a cooling effect on all the wall surface nearer to the mouth than the point of impact and no appreciable cooling effect on any wall surface nearer to the base of the bottle. More uniform cooling is thus obtained by directing a large proportion of air against the base part of the bottle, since all the air so directed has some cooling effect on the whole surface.

Air should be directed into the corner at the base, so as to ensure rapid movement of air over the surface in the corner, and it has been found most effective in securing uniform cooling to direct a larger volume of air per unit of surface against the inner wall for a short distance from the corner away from the base. Such larger volume may also be directed against the surface of the base near the corner.

According to the invention, the amount of gaseous cooling medium blown against the inner surface is greater than the amount blown against the outer surface to an extent sufficient to secure that the inner and outer surfaces cool at substantially the same rate. Further, more heat is abstracted by the cooling medium from the inner surface than from the outer surface.

Figure 2:
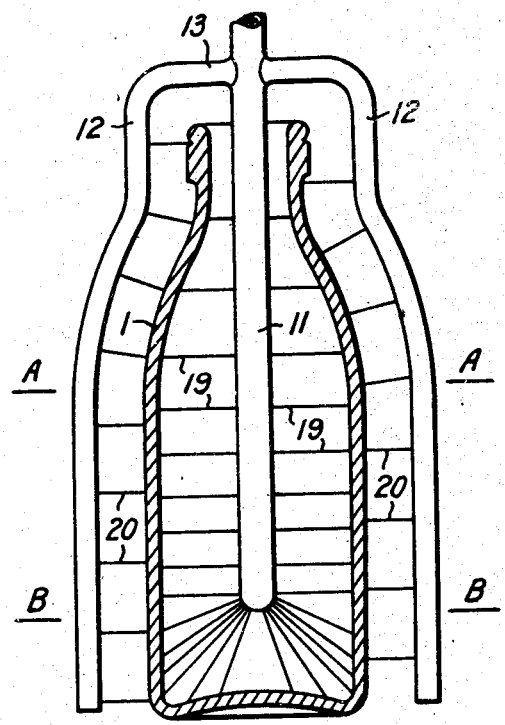

In the accompanying drawing, Figure 1 is a side view of the blowing apparatus, showing the bottle and stand in section, and Figure 2 is a view on an enlarged scale showing the blowing tubes and the bottle in section.

The drawing shows a bottle of the type used for the distribution of milk, having a diameter less than twice its length, and with an approximately cylindrical body portion reaching up to the line A—A of Figure 2, and a tapering neck portion. The bottle 1 rests on an asbestos disc 2 held in a frame 3 adapted to be rotated in the bearing 4 by a pulley 5. A single jet tube 6 passes through the frame 3 and is supplied with air by the pipe 7, to direct the air against the bottom of the bottle. The disc 2 has a central hole 8 of approximately the diameter of the bottle, but with four inwardly projecting lugs 9 on which the bottle rests, while four asbestos pads 10 retain the bottle in position. Nearly all the bottom of the bottle is therefore exposed to the air jet.

The inner blowing tube 11 from which a pair of outer blowing tubes 12 branch at 13, is held by the arm 14, which is pivoted at 15, so that, by turning the arm 14, the blowing tubes are lifted clear of the bottle. The arm 16, shown broken off, is adapted to take a counterweight, and a stop 17 is provided on which the arm 14 rests when the blowing tubes are in operative position. The inner and outer blowing tubes are supplied with air by the pipe 18, and the outer tubes 12 are curved to follow approximately the contour of the bottle, so that all jet holes are approximately at the same distance from the surface of the bottle.

Referring to Figure 2, the inner and outer blowing tubes 11 and 12 are provided with jet holes which are indicated on the drawing by lines 19 from the inner tube and 20 from the outer tubes, these lines indicating the direction of the jet from each hole. For the sake of clearness, the lines 19 are shown as all issuing from the inner tube 11 in one plane but, in practice, the jet holes are more conveniently distributed round the tube.

Assuming all jet holes to be of the same size, about 75% more air is blown against the inner surface from the 30 jet holes in the inner tube 11 than from the 17 jet holes in the outer tubes 12. Further, considering only the body portion up to the line A—A, there are 12 jet holes blowing against the upper half and 16 jet holes blowing against the lower half including the base, and 8 jet holes blowing against the upper half. Further, considering the portion up to the line B—B of Figure 2, which is one-sixth of the total height of the bottle, about 40% of the total amount of air from the inner tube is blown against the wall and base up to this line.

In practice it is generally more convenient to have a smaller number of holes of larger size in the inner tube.

The actual quantities of air blown against the inside and the outside and the distribution of air in the inside which give the best result can only be found by trial, preferably by subjecting the bottle to thermal shock tests. The example given indicates a satisfactory distribution for the bottle shown, and will serve to illustrate more clearly than would a general description the approximate distribution required to satisfactorily temper open ended hollow glass articles of this general type.

The object of the invention is to obtain a high degree of toughening, but it is often desirable to avoid so high a degree that the fracture of the bottle is explosive. A high degree of toughening which is just short of giving an explosive fracture, gives the bottle nearly the maximum resistance to thermal shock.

The inner and outer jets are symmetrically placed with reference to the centre line of the bottle, so that their pressures against the sides of the bottle are balanced, and the bottle is rotated so as to secure uniformity of cooling. Rotation of the blowing tubes while the bottle is stationary gives the same result, but is less convenient constructionally.

The inner and outer jet tubes may be connected independently to the air supply, with valves in the connections, so that the air pressures in the inner and outer tubes may be varied.

Where, in the claims, relative amounts of air are specified, it is assumed that the air pressures in the inner and outer tubes are approximately equal, so that the air jets issue with approximately equal velocities.

Having described my invention, I declare that what I claim and desire to secure by Letters Patent is:

1. A process of tempering a hollow glass article having a closed base and an open top and having a height at least twice its diameter, by heating the same to a temperature adjacent its softening point and rapidly chilling the heated article by directing jets of gaseous chilling fluid against its inner and outer surfaces which is characterized by directing a greater amount of chilling fluid against its inner surfaces than against its outer surfaces, and directing more than half of the chilling fluid that is directed against its inner surfaces against the lower half thereof.

2. A process of tempering a hollow glass article having a closed base and an open top and having a height at least twice its diameter, by heating the same to a temperature adjacent its softening point and rapidly chilling the heated article by directing jets of gaseous chilling fluid against its inner and outer surfaces which is characterized by directing a greater amount of chilling fluid against its inner surfaces than against its outer surfaces, and directing at least two-thirds of the chilling fluid that is directed against the inner surfaces of the article against the base and lower half of the inner surfaces thereof.

3. A process of tempering a hollow glass article having a closed base and an open top and having a height at least twice its diameter, by heating the same to a temperature adjacent its softening point and rapidly chilling the heated article by directing jets of gaseous chilling fluid against its inner and outer surfaces which is characterized by directing a greater amount of chilling fluid against its inner surfaces than against its outer surfaces, and directing at least 40% of the chilling fluid that is directed against the inner surfaces of the article against the base and a zone extending not more than one-sixth of the way up the inner wall of the article.

JOHN BAWDEN MITFORD.